US010643495B2

(12) United States Patent
Boettcher et al.

(10) Patent No.: US 10,643,495 B2
(45) Date of Patent: May 5, 2020

(54) WELDING SPEED PACING DEVICE

(71) Applicant: REALITYWORKS, INC., Eau Claire, WI (US)

(72) Inventors: Timmothy A. Boettcher, Altoon, WI (US); Scott Jameson, Hudson, WI (US); Jeremiah R. Bauer, Mondovi, WI (US)

(73) Assignee: Realityworks, Inc., Eau Claire, WI (US)

( * ) Notice: Subject to any disclaimer, the term of this patent is extended or adjusted under 35 U.S.C. 154(b) by 568 days.

(21) Appl. No.: 15/511,874

(22) PCT Filed: Sep. 18, 2015

(86) PCT No.: PCT/US2015/050834
§ 371 (c)(1),
(2) Date: Mar. 16, 2017

(87) PCT Pub. No.: WO2016/044680
PCT Pub. Date: Mar. 24, 2016

(65) Prior Publication Data
US 2017/0249858 A1    Aug. 31, 2017

Related U.S. Application Data

(60) Provisional application No. 62/052,819, filed on Sep. 19, 2014.

(51) Int. Cl.
*G09B 19/24* (2006.01)
*B23K 9/32* (2006.01)
*B23K 9/095* (2006.01)
*G09B 5/02* (2006.01)

(52) U.S. Cl.
CPC .............. *G09B 19/24* (2013.01); *B23K 9/095* (2013.01); *B23K 9/0953* (2013.01); *B23K 9/0956* (2013.01); *B23K 9/32* (2013.01); *G09B 5/02* (2013.01)

(58) Field of Classification Search
CPC ........ G09B 19/24; G09B 5/02; B23K 9/0953; B23K 9/9056; B23K 9/32; B23K 9/095
See application file for complete search history.

(56) References Cited

U.S. PATENT DOCUMENTS

| 3,849,908 A | 11/1974 | Sturgeon |
| 3,867,769 A | 2/1975 | Schow et al. |
| 4,124,944 A | 11/1978 | Blair |
| 4,132,014 A | 1/1979 | Schow |
| 4,399,346 A | 8/1983 | Kearney |
| 4,471,207 A | 9/1984 | Hawkes |
| 4,680,014 A | 7/1987 | Paton et al. |

(Continued)

FOREIGN PATENT DOCUMENTS

| EP | 0963744 A1 | 12/1999 |
| JP | 6294603 A | 10/1994 |

(Continued)

*Primary Examiner* — Robert J Utama
(74) *Attorney, Agent, or Firm* — Sherrill Law Offices, PLLC

(57) ABSTRACT

A self-contained speed indicator (10) that can be placed next to a weldment (11) and configured for a desired speed, which then provides a target speed indicator (10) to help a welder (14) practice maintaining that desired speed.

20 Claims, 10 Drawing Sheets

(56) References Cited

U.S. PATENT DOCUMENTS

| | | | |
|---|---|---|---|
| 4,689,021 A * | 8/1987 | Vasiliev | G09B 19/24 434/234 |
| 4,716,273 A | 12/1987 | Paton et al. | |
| 4,931,018 A | 6/1990 | Herbst et al. | |
| 5,329,091 A | 7/1994 | Bissinger | |
| 5,464,957 A * | 11/1995 | Kidwell | B23K 9/0956 219/130.01 |
| 5,543,600 A | 8/1996 | Ozamoto et al. | |
| 5,679,272 A * | 10/1997 | Aderhold | B23K 11/063 219/64 |
| 5,708,253 A | 1/1998 | Bloch et al. | |
| 6,242,711 B1 | 6/2001 | Cooper | |
| 6,583,386 B1 | 6/2003 | Ivkovich | |
| 6,627,850 B1 | 9/2003 | Koga et al. | |
| 6,734,393 B1 | 5/2004 | Friedl et al. | |
| 6,909,066 B2 | 6/2005 | Zheng et al. | |
| 6,953,917 B2 | 10/2005 | Chenault | |
| 7,119,704 B2 * | 10/2006 | Grzan | H01H 3/141 340/665 |
| 7,150,047 B2 | 12/2006 | Fergason | |
| 7,298,535 B2 | 11/2007 | Kuutti | |
| 7,817,162 B2 | 10/2010 | Bolick et al. | |
| 7,839,416 B2 | 11/2010 | Ebensberger et al. | |
| 7,839,417 B2 | 11/2010 | Ebensberger et al. | |
| 7,962,967 B2 | 6/2011 | Becker et al. | |
| 8,075,314 B2 | 12/2011 | Cabrera | |
| 8,115,138 B2 | 2/2012 | Jacovetty et al. | |
| 8,144,193 B2 | 3/2012 | Melikian et al. | |
| 8,255,190 B2 | 8/2012 | Hala et al. | |
| 8,274,013 B2 | 9/2012 | Wallace | |
| 8,296,240 B2 | 10/2012 | Read | |
| 8,316,462 B2 | 11/2012 | Becker et al. | |
| 8,457,949 B2 | 6/2013 | Huh | |
| 8,569,655 B2 | 10/2013 | Cole | |
| 10,417,934 B2 * | 9/2019 | Becker | G09B 19/24 |
| 10,427,239 B2 * | 10/2019 | Becker | B23K 9/0953 |
| 2003/0000931 A1 | 1/2003 | Ueda et al. | |
| 2003/0182178 A1 | 9/2003 | D'Elena et al. | |
| 2005/0252897 A1 | 11/2005 | Hsu et al. | |
| 2006/0136183 A1 | 6/2006 | Choquet | |
| 2006/0263752 A1 | 11/2006 | Moore | |
| 2007/0114215 A1 * | 5/2007 | Bill | B23K 9/0008 219/130.01 |
| 2008/0038702 A1 | 2/2008 | Choquet | |
| 2008/0076098 A1 | 3/2008 | Kellet | |
| 2008/0078811 A1 | 4/2008 | Hillen et al. | |
| 2008/0314887 A1 * | 12/2008 | Stoger | B23K 9/0956 219/137 R |
| 2009/0231423 A1 | 9/2009 | Becker et al. | |
| 2009/0298024 A1 | 12/2009 | Batzler et al. | |
| 2010/0048273 A1 | 2/2010 | Walalce et al. | |
| 2010/0062405 A1 | 3/2010 | Zboray et al. | |
| 2010/0062406 A1 | 3/2010 | Zboray et al. | |
| 2010/0073363 A1 | 3/2010 | Densham et al. | |
| 2010/0223706 A1 | 9/2010 | Becker et al. | |
| 2010/0224610 A1 | 9/2010 | Wallace | |
| 2011/0006047 A1 | 1/2011 | Penrod et al. | |
| 2011/0083241 A1 | 4/2011 | Cole | |
| 2011/0114616 A1 | 5/2011 | Albrecht | |
| 2011/0117527 A1 | 5/2011 | Conrardy et al. | |
| 2011/0156989 A1 | 6/2011 | Huh | |
| 2011/0183304 A1 | 7/2011 | Wallace et al. | |
| 2011/0251838 A1 | 10/2011 | Huh | |
| 2012/0035986 A1 | 2/2012 | Jimenez | |
| 2012/0122062 A1 | 5/2012 | Yang et al. | |
| 2012/0189993 A1 | 7/2012 | Kinding et al. | |
| 2012/0291172 A1 | 11/2012 | Wills et al. | |
| 2013/0040270 A1 | 2/2013 | Albrecht | |
| 2013/0206740 A1 | 8/2013 | Pfeifer et al. | |
| 2013/0206741 A1 | 8/2013 | Pfeifer et al. | |
| 2014/0042136 A1 * | 2/2014 | Daniel | B23K 9/0953 219/130.5 |
| 2014/0183176 A1 | 7/2014 | Hutchison et al. | |
| 2014/0263224 A1 * | 9/2014 | Becker | B23K 9/0956 219/124.5 |
| 2014/0272837 A1 * | 9/2014 | Becker | G09B 19/24 434/234 |
| 2016/0089751 A1 | 3/2016 | Batzler et al. | |
| 2016/0260261 A1 | 9/2016 | Hsu | |
| 2016/0267806 A1 | 9/2016 | Hsu et al. | |

FOREIGN PATENT DOCUMENTS

| | | |
|---|---|---|
| JP | 2001071140 A | 3/2001 |
| JP | 2004090041 A | 3/2004 |
| JP | 2005309525 A | 11/2005 |
| JP | 2011167756 A | 9/2011 |
| WO | 2004/057554 A2 | 7/2004 |
| WO | 2008/151393 A1 | 12/2008 |
| WO | 2010/020867 A2 | 2/2010 |
| WO | 2010/101683 A1 | 9/2010 |
| WO | 2011/097035 A2 | 8/2011 |
| WO | 2011/126571 A1 | 10/2011 |
| WO | 2013/008235 A2 | 1/2013 |

\* cited by examiner

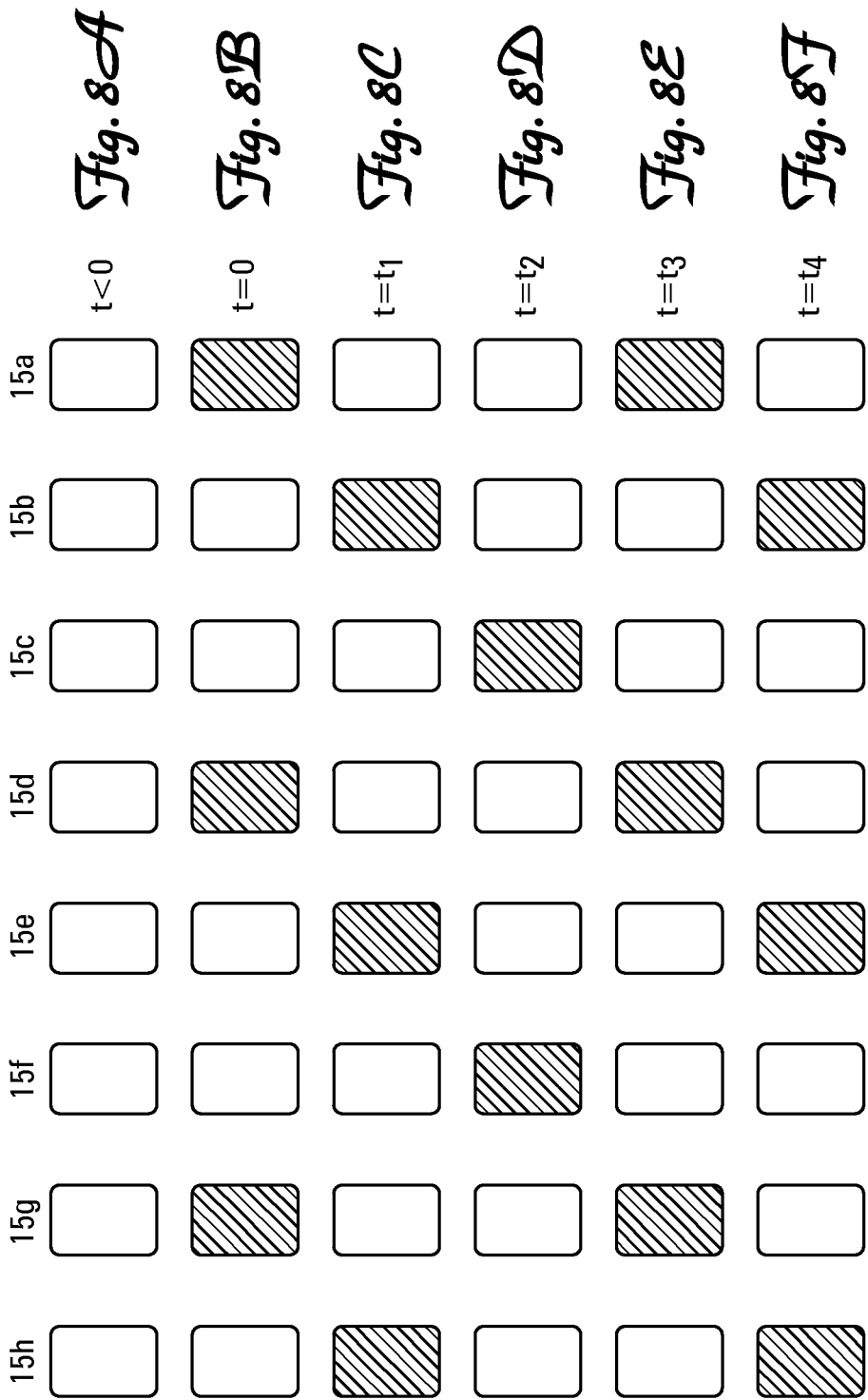

WELDING SPEED PACING DEVICE

BACKGROUND

This invention relates to welding training. More specifically, it relates to a system and method for enabling a welder to calibrate themselves to a target welding speed.

There are many critical elements to creating a high quality weld. Some of these are equipment related, such as having the correct voltage and current, the correct wire or electrode, the correct wire feed speed (in a gas metal arc weld), and correct shielding gas (when used). Other factors are driven by the operator themselves, including welding speed, stick-out or contact to work distance, straightness, and orientation of the gun during the weld. Advancements in equipment continue to address equipment-related errors, technology has not been as successfully applied to operator error factors.

While several training aids have been introduced into the market in recent years to help students learn proper welding techniques, the impetus for such products has been around for decades. Indeed, the patent issued to Moberg in 1943 as U.S. Pat. No. 2,333,192 entitled Welder's Training Device describes a simulated stick welding gun, with a retracting welding rod and a visual signal to indicate to the user when they fail to maintain correct arc length on a SMAW system.

Training aids have evolved in the 70 years since then, and there are both simulators such as Lincoln Electric's VRTEX 360 and live action welding trainers such as RealWeld System's trainer which track and report on physical movements during a simulated or real weld, respectively. However, these systems are both complicated and expensive, and are not feasible to implement in every welding booth in a classroom.

Welding speed, or arc speed, in particular, has a large impact on the quality of a weld. If the speed is too great, not enough heat is generated, root penetration decreases, and the bead is too small, making for a weak joint. If the speed is to slow, too much heat is generated, the puddle becomes too large resulting in a large bead, and penetration falls again as heat is absorbed by the large molten puddle and not directed into the base metal. Welding speed also varies considerably based on metal type and thickness. Aluminum requires a much faster welding speed than stainless steel, for example, and a ½ inch plate requires a much slower speed than a ⅛ inch plate to obtain proper penetration and joint strength. Moving too fast results in a weak joint, and moving too slow can also result in burning through the metal altogether.

During the welding process, the welder's attention should be focused on the puddle and maintaining welding tool orientation as well as speed. Trained welders frequently begin a weld session by setting up their equipment, positioning themselves in front of the weldment, and taking several practice runs before they actually strike an arc. These practice runs allow the welder to verify that they can complete the weld in a smooth motion without having to stop to reposition, and allows them to review their tool orientation and practice their speed. There is nothing providing feedback during these practice runs.

There therefore exists a need for a cost effective system that can provide speed feedback prior to a weld to enable the welder to calibrate their muscle memory to the correct speed required for a given welding procedure specification.

SUMMARY

This invention is a self-contained speed indicator that can be placed next to a weldment, configured for a desired speed, and which can then provide a target speed indicator to practice maintaining that desired speed.

The speed indicator may be part of a larger system that provides feedback on other parameters, including for example work angle and travel angle of the welding gun. The speed indicator may also contain sensors to detect the actual position and speed of the welding gun during the weld. This data can be subsequently analyzed for assessment or constructive feedback for the user after the weld is completed.

The invention can contain an input means for selecting a WPS, which defines the speed. In the simplest embodiment, this could be a dial on the speed indicator for selecting a numeric speed. In more complex embodiments, this could be a user interface on a mobile device or a networked computer that is in communication with the speed sensor.

The target speed indication, in the preferred embodiment, is a series of visual indicators, such as high efficiency LEDs, arranged in a sequential fashion along the length of the weld. These visual indicators are illuminated in a sequence that demonstrates to the observer how fast the welding tool should be moved to realize the desired speed. The indicators could be arranged in a linear fashion, or in a curved or flexible fashion to accommodate pipe and other weld joint types and applications.

A mounting means enables these visible indicators to be positioned along the weld line, so that the end user can observe them with minimal diversion of their gaze as they perform a practice dry-run. In the simplest embodiment this would be a straight line that could accommodate flat, horizontal, vertical, and overhead weld orientations, although other form factors are envisioned that could also accommodate round (pipe) weld orientations.

By synchronizing the position of the gun with the moving lights on the speed indicator, the welder is able to calibrate themselves to the desired speed that they need to maintain during a welding operation.

BRIEF DESCRIPTION OF THE DRAWINGS

FIG. 6, encompassing chronological depictions 6A-6F, is one embodiment of a speed indication scheme.

FIG. 7, encompassing chronological depictions 7A-7F, is a second embodiment of a speed indication scheme.

FIG. 8, encompassing chronological depictions 8A-8F, is a third embodiment of a speed indication scheme.

DETAILED DESCRIPTION OF THE INVENTION

Figure 1:
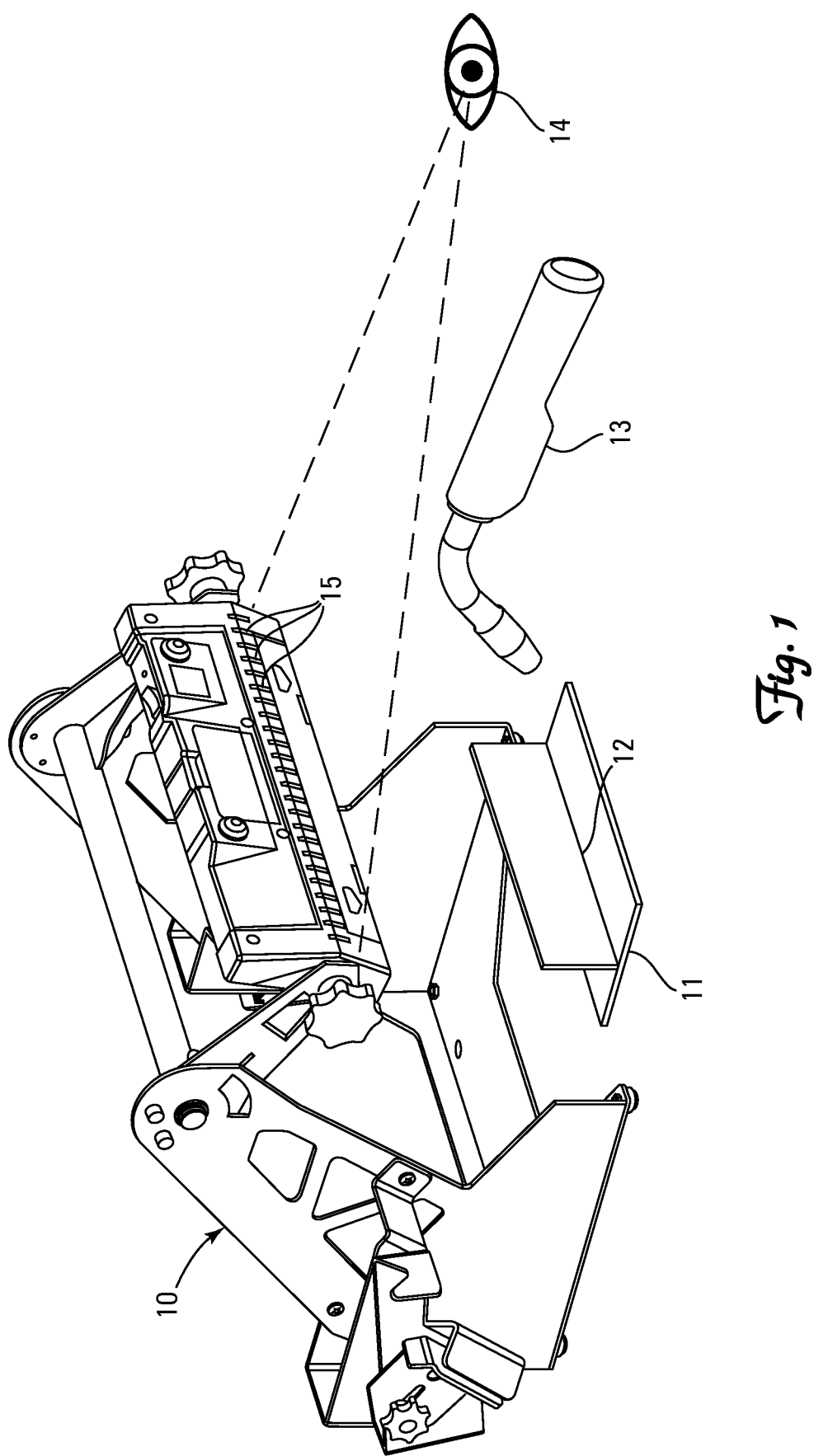
FIG. 1 is a perspective view of one embodiment of the invention with the visible light emitters facing forward and the sensors facing downward.

| Nomenclature Table | |
|---|---|
| REF. No. | NAME |
| 10 | Speed Indicator |
| 11 | Weldment |
| 12 | Weld Joint |
| 13 | Welding Gun |
| 14 | Welder (person) |
| 15 | Visual Indicator |
| 15a | Visual Indicator - first location |
| 15b | Visual Indicator - second location |
| 15c | Visual Indicator - third location |
| 15d | Visual Indicator - fourth location |
| 15e | Visual Indicator - fifth location |
| 15f | Visual Indicator - sixth location |
| 15g | Visual Indicator - seventh location |
| 15h | Visual Indicator - eighth location |
| 15n | Visual Indicator - final |
| 20 | Frame |
| 21 | Housing |
| 22 | Calibration Holster |
| 23 | Housing Adjustment Arm |
| 24 | Ball-nose Spring Plunger |
| 25 | First Pivot Point |
| 26 | Second Pivot Point |
| 27 | Raised Housing Position |
| 28 | Lowered Housing Position |
| 29 | Speed Selector |
| 30 | Indication Zone |
| 30a | Indication Zone - first location |
| 30b | Indication Zone - second location |
| 30c | Indication Zone - third location |
| 30d | Indication Zone - fourth location |
| 30e | Indication Zone - fifth location |
| 30f | Indication Zone - sixth location |
| 31 | Presence Sensor |
| 31a | Presence Sensor - first sensor |
| 31b | Presence Sensor - second sensor |
| 31c | Presence Sensor - third sensor |
| 50 | Power Connector |
| 53 | On/Off Switch |
| 60 | Microcontroller |
| 61 | Wireless Communication Module |
| 62 | Electronic Memory |
| 63 | Battery Charging Circuit |
| 64 | Battery |
| 65 | Regulator Circuit |
| 70 | Power Up Step |
| 71 | Status Check of Speed Selector Switch |
| 72 | Initiation of Visual Indicators |
| 73 | Cycling of Visual Indicators |
| 74 | Status Check of Speed Selector Switch |
| 75 | Decision Step |
| 76 | Do Loop Step |
| 201 | Crossbar |
| 202 | Retaining Ring |
| 203 | Shim |
| 204 | Wave Washer |
| 205 | Nylon Snap In Bearing |
| 206 | Crossbar Opening |
| 210 | Bushing |
| 211 | Knob |
| 212 | Threaded Stud |
| 213 | Housing Attachment Opening |
| 214 | Bushing Mating Surface |
| 215 | Knob Mating Surface |

Definitions

As utilized herein, the phrase "Speed Indicator" means the overall embodiment of the invention, comprising visual indicators, a processing means for activating and de-activating these visual indicators in a controlled manner, and a mechanical means for locating the visual indicators in proximity to a weldment.

As utilized herein, the phrase "Welding Gun" means any portable device used in the welding process to direct the activity of the welding process, also often referred to in the industry as a torch or a tool.

As utilized herein, the term "Welder" means the actual person who is manually operating the welding gun.

As utilized herein, the phrase "Visual Indicator" means a visually perceptible signal on the speed indicator which can be activated and deactivated by the processing means within the speed indicator, forming at least two states (such as on and off) or a series of states such as that achieved through gradual activation of the signal.

As utilized herein, the phrase "Indication Zone" means the area between a visual indicator and the weldment, along the shortest length between the two, and extending out to each side a distance equal to one-half the distance between adjacent visual indicators. This is the area each visual indicator is representing when it is activated.

As utilized herein, the phrase "Indicator Time Interval" means a time duration equivalent to the length of time the welding gun is expected to be within an indication zone at a given speed.

Construction

The welding speed indicator 10 can be used in a welding environment, whether that is on a welding bench in a training lab, or in a shop, at a remote work location, or any of the countless other places where welding is performed. In the sample use environment shown in FIG. 1, the speed indicator 10 is located above a weldment 11, in this case a T-joint. The T-joint is formed by two pieces of metal forming a right angle, where the junction forms the weld joint 12. The welder 14 will be holding the welding gun 13 for this manual welding operation. The welding speed indicator 10 is configured and arranged so that a welder 14 will be able to look past the welding gun 13 to see visual indicators 15 on the welding speed indicator 10 as the welder 14 moves the welding gun 13 along the weld joint 12 while practicing the weld.

Figure 2:
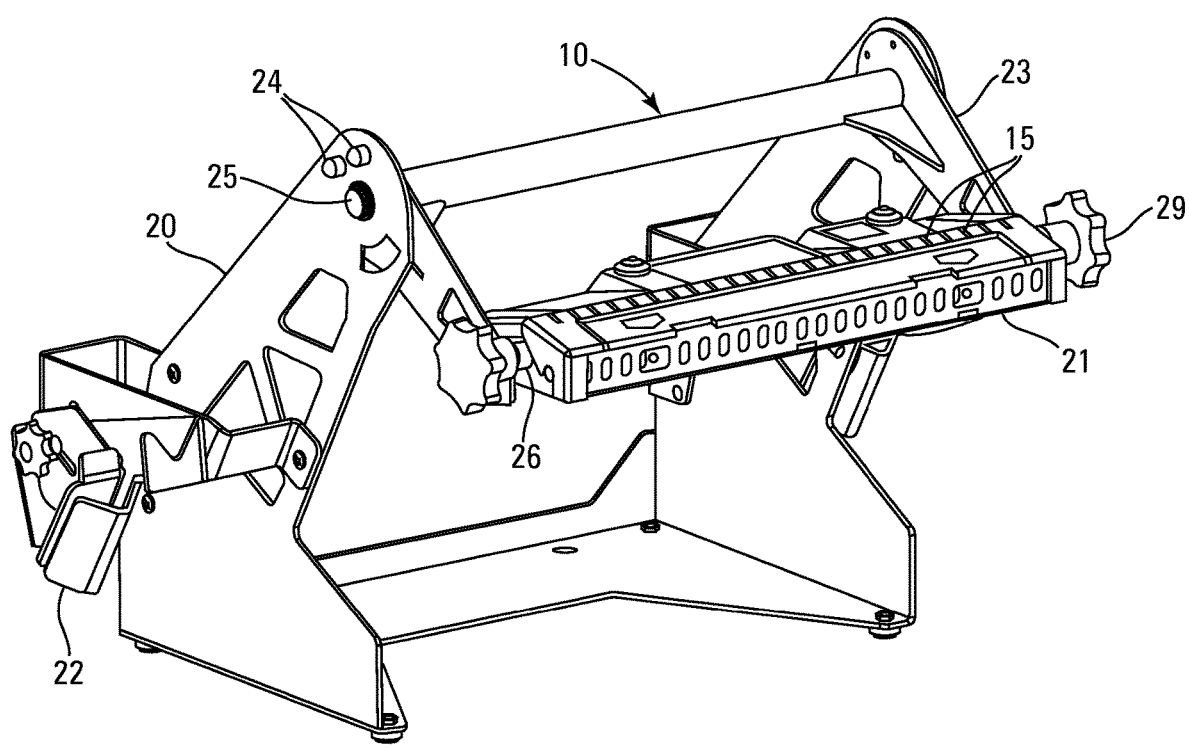
FIG. 2 is a perspective view of the invention depicted in FIG. 1 with the visible light emitters facing upward and the sensors facing forward.

In the preferred embodiment, as shown in FIG. 2, the speed indicator 10 is composed of electronics within a housing 21 supported by a frame 20.

The housing 21 protects the electronics from the hazardous environment in which the speed indicator 10 will be used, including sparks, heat, gases, and metal shorting hazards. A calibration holster 22 is attached to the frame 20 to facilitate coordination of indicators to actual sensed locations in applications where the speed indicator 10 forms part of a larger welding training system. A speed selector switch 29 is visible on the side of the preferred embodiment, representing one method for identifying the desired target speed. By rotating this round switch, the user can select any speed from a minimum up to a maximum speed. Alternatively, the switch could have a fixed number of positions, such that a finite number of speeds could be selected between a minimum and a maximum speed in discrete steps. One can also appreciate that the speed could be selected in a remote user interface and communicated to the speed indicator 10 electronically, such as through a Bluetooth connection with a mobile app on a mobile phone.

Figure 3:
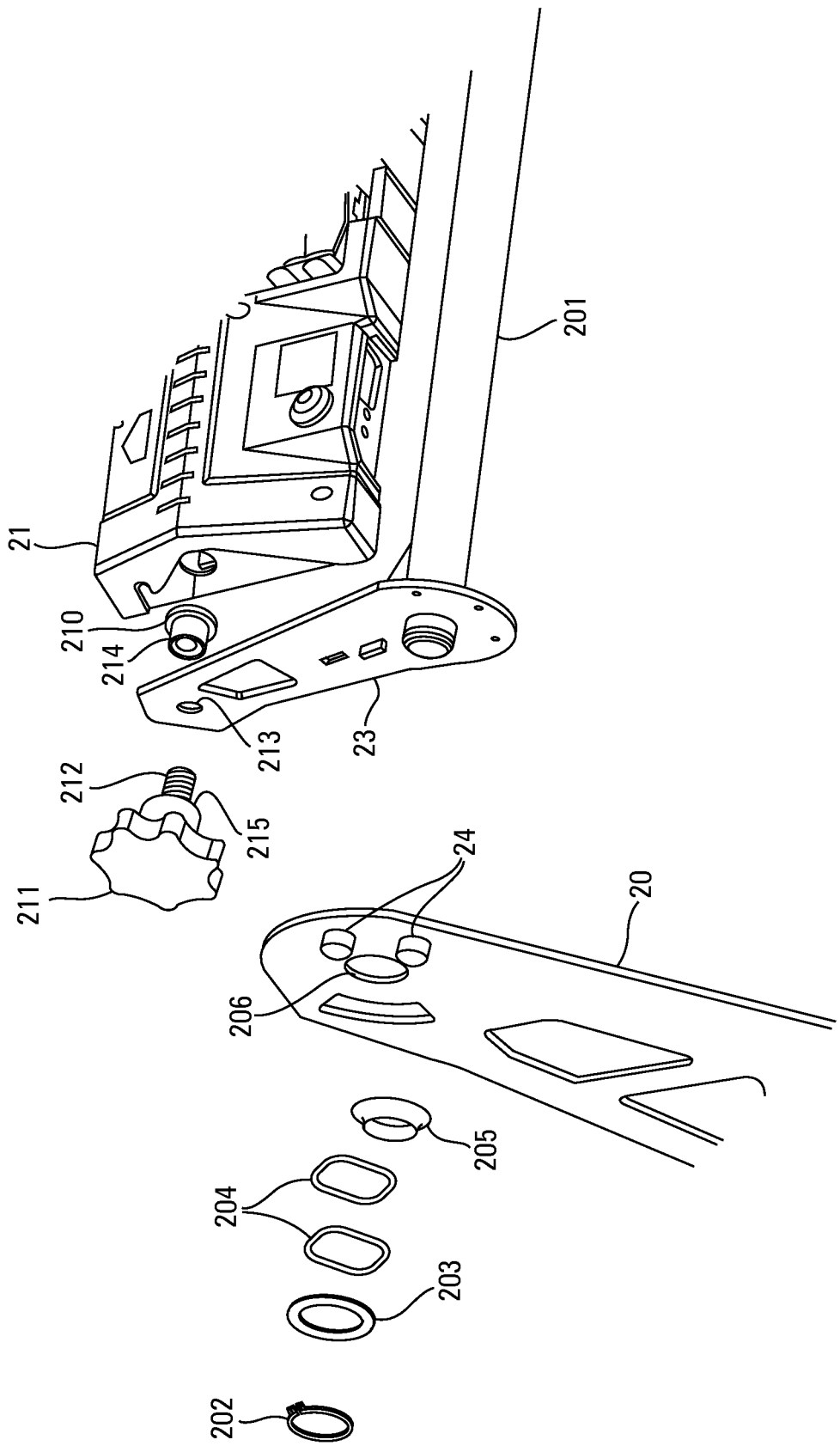
FIG. 3 is an exploded perspective view of a portion of the invention depicted in FIG. 1.

Referring to the embodiment depicted in FIGS. 1, 2, 3, 4A and 4B, the proximity of the visual indicators 15 in the housing 21 to the weldment 11 and the visibility of the visual indicators 15 to a welder 14 can be adjusted by changing the configuration of the housing adjustment arm 23 and/or the housing 21 relative to the frame 20. In a preferred embodiment, as shown in FIG. 2, a housing adjustment arm 23 is connected to the frame 20. FIG. 3 provides more detail of this connection. The two housing attachment arms 23 are connected by a cross bar 201 welded rigidly between them. A nylon snap-in bearing 205 is placed over the end of the crossbar 201. The end of the cross bar is then placed through the crossbar opening 206 in the frame 20 such that the bearing is resting on the crossbar opening 206. Two wave washers 204 are then placed on the crossbar 201 from the outside to provide pressure and resistance to the joint. A shim 203 can then added to take up any extra space, followed by a retaining ring 202 to hold the joint together. This assembly is repeated on the opposite side. The joint thereby created in a first pivot point 25 about which the housing adjustment arm 23 can rotate with respect to the frame 20.

Figure 4:
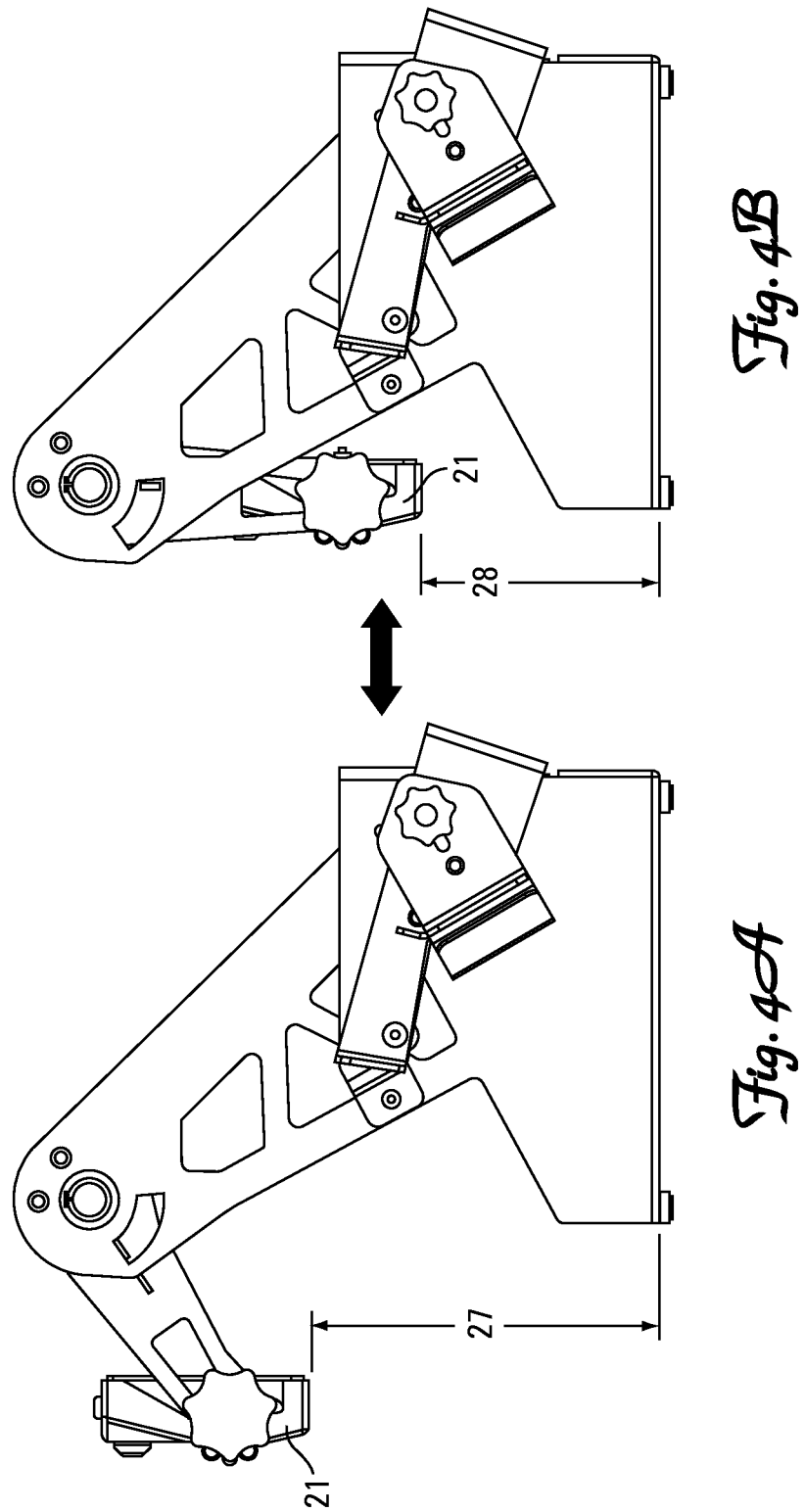
FIG. 4A is a side view of the invention depicted in FIG. 1 with the arm rotated forward.
FIG. 4B is a side view of the invention depicted in FIG. 1 with the arm rotated downward.

Referring to a preferred embodiment in FIG. 2, two ball-nose spring plungers 24 are installed in the frame 20 that interact with three corresponding receiving holes in the housing adjustment arm 23 to create two possible positions. The first, a raised housing position 27 is shown in FIG. 4A. The second, a lowered housing position 28 is shown in FIG. 4B. These two positions provide options for adjusting the proximity of the visual indicators 15 to the weldment 11 so that the welder 14 can readily view them while making practice passes.

FIG. 3 shows the details of a preferred second pivot point 26 between the housing 21 and the housing adjustment arm 23. A bushing 210 is welded onto each end of the housing, 21 in line such that they create an axle around which the housing 21 can rotate. The inside of the bushing 210 is threaded. A knob 211 with a threaded stud 212 forms the other half of this joint. The housing 21 is placed between the two housing adjustment arms 23 such that the bushings 210 align with the housing attachment opening 213 in the housing adjustment arms 23. The threaded stud 212 of the knob 211 is placed through this opening 213 and threaded into the bushing 210 until the mating surface of the bushing 214 and the mating surface of the knob 215 both come into contact with the metal surface of the housing adjustment arm 23. Additional tightening of this knob 211 then creates friction between these surfaces which prevents further rotation of the housing 21 relative to the arm 23. Loosening of this knob 211 relaxes that friction and enables the user to pivot the housing 21, followed by retightening the knob 211 to secure a new position. The user can thus rotate the housing 21 about this pivot point 26 to keep the indicators 15 visible to the user, regardless of the housing 21 position or viewing angle of the user.

The rotation about the first pivot point 25, which changes the height of the housing 21 and indicators, can be free of restriction or as in the case of the preferred embodiment a plurality of fixed optional stopping points can be created by use of ball spring plungers 24 between the frame 20 and the housing adjustment arm 23. Use of these plungers 24 and pivot points 25 and 26 enables multiple height positions, as represented in FIGS. 4A and 4B with a raised housing location 27 and a lowered housing location 28 both available with the same hardware.

Figure 5:
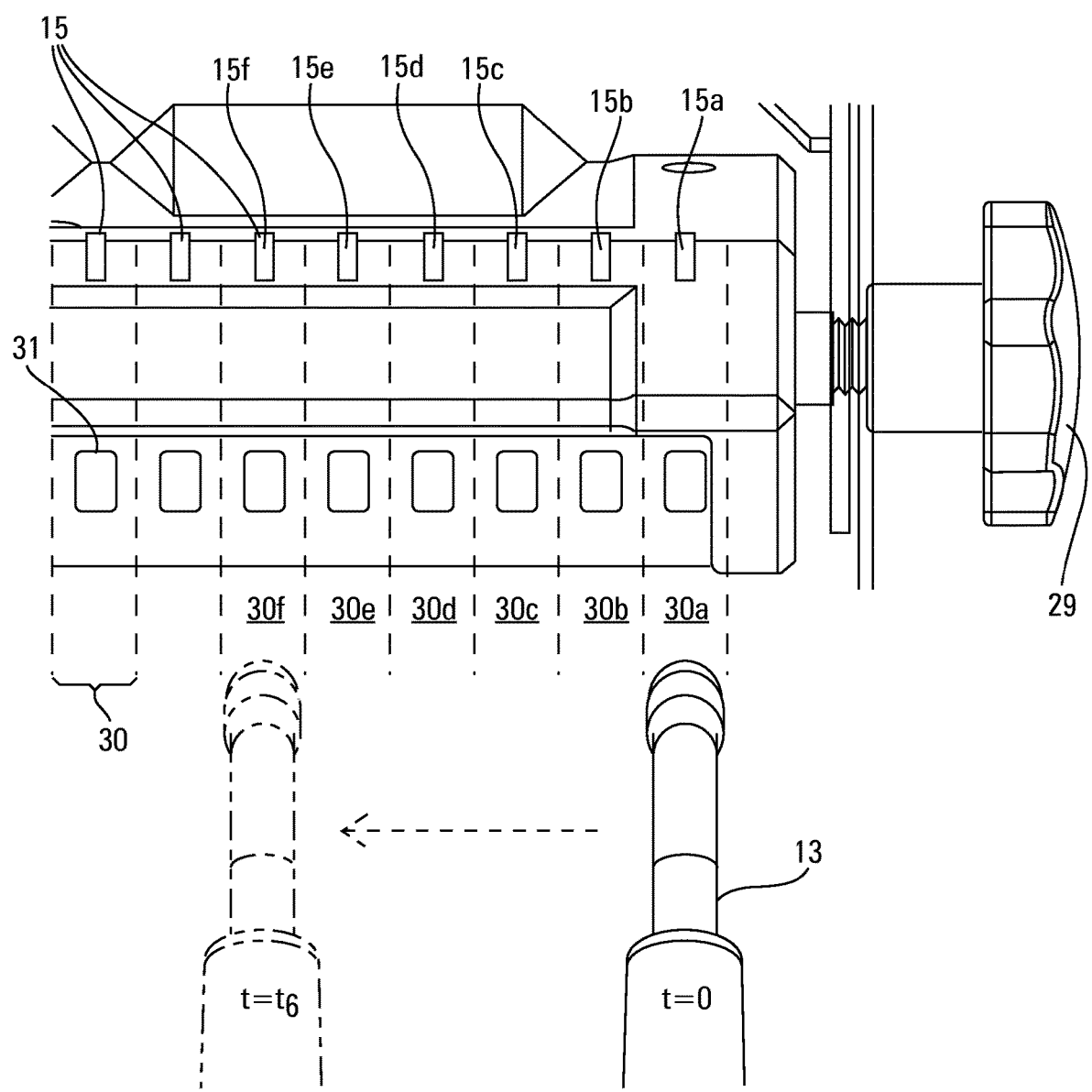
FIG. 5 is an enlarged view of a portion of the invention depicted in FIG. 1.

When the welder 14 brings the welding gun 13 near the weld joint 12 on the weldment 11, the welder 14 can view both the weld joint 12 and at least one of the visual indicators 15 with only a slight diversion of his gaze. As seen in FIG. 5, at an initial time (t=0), the welding gun 13 as seen by the welder 14 is in line with the first visual indicator 15a. In the preferred embodiment, the visual indicators 15 are spaced 0.5 inches apart. Each visual indicator 15 is centered within an indication zone 30 that is the same width as the spacing of the visual indicators 15, and extending down from the visual indicator 15 to the weldment 11.

As shown in FIG. 5, individual indicators are identified (15a, 15b 15c, 15d, 15e, and 150 to assist in describing several example visual indication patterns. Each of these visual indicators (15a, 15b 15c, 15d, 15e, and 150 has its own associated indication zone—15a has 30a, 15b has 30b, 15c has 30c, 15d has 30d, 15e has 30e, 15f has 30f and so on through 15n and 30n. When a visual indicator 15 is activated, it indicates that the welding gun 13 should be within its indication zone 30. While at the initial time (t=0) the welding gun 13 should be within the first indicator's indication zone 30, at a later time, such as time t=$t_6$, the gun should be located within that indicator's indication zone 30f.

The visual indicators 15 should face the user when the speed indicator 10 is properly aligned over the weldment 11. These visual indicators 15 could extend over a fixed length, such as a 2-inch length, over which the user can verify their pacing. These visual indicators 15 could also be the same length as the weldment 11, so that the user can verify their pacing over the entire expected length of their weld. These visual indicators 15 could also be an extended length, beyond what is normally expected, so that the speed indicator 10 can be used in many applications without needing to have different sizes of speed indicator 10 for different applications (for example, a 12 inch speed indicator 10 could be used for 4 inch, 6 inch, 8 inch or 12 inch welds).

Figures 6A, 6B, 6C, 6D, 6E, 6F:
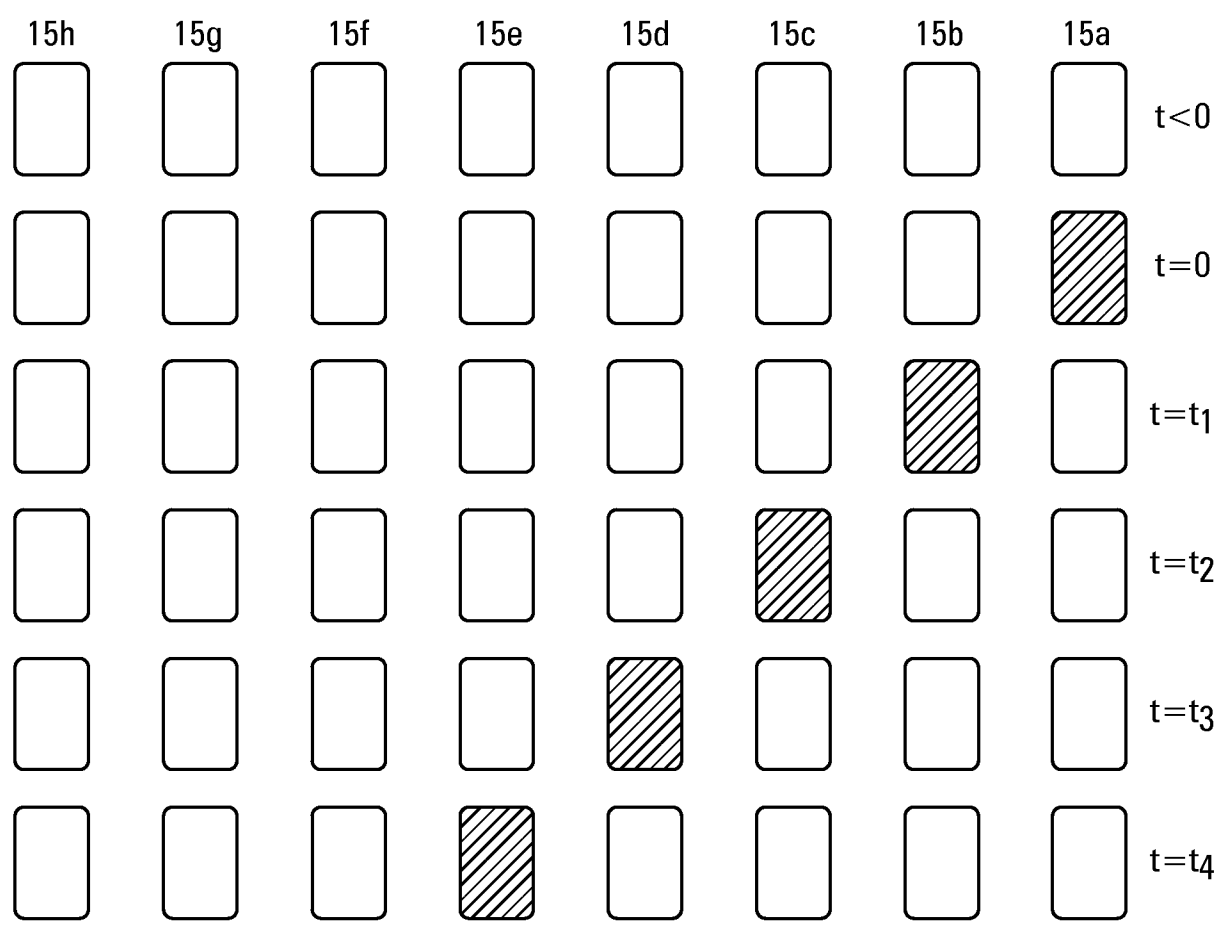

FIG. 6 describes one speed indication scheme, though others are possible. In this model, a single visual indicator 15 is activated at a time, during the time period that the welding gun 13 should be transiting its indication zone 30. To be more precise, when a speed is selected, the microcontroller 60 will calculate how much time the welding gun 13 should take to pass through one indication zone 30 distance at that speed. This will be an indicator time interval. For example, dividing a 0.5 inch indication zone by a 6 inch per minute speed would result in an interval time of 5 seconds (one-twelfth of a minute). As shown in FIG. 6A representing the initial state, all visual indicators 15 will be inactive. Then, as shown in FIG. 6B representing time t=0, the first visual indicator 15a will activate. During the time that indicator 15a is active, the welder 14 should be moving the gun from the beginning of the indication zone 30a to the end of it. After the indicator time interval, the first visual indicator 15a will de-activate and the second one 15b will activate. This is shown in FIG. 6B, representing time t=$t_1$. After another time interval, the second visual indicator 15b will de-activate and the next one 15c will activate (FIG. 6C). This will continue until the final visual indicator 15n is reached. When that visual indicator 15 has been activated for one indicator time interval, it will de-activate and the first one 15a will activate again, and the cycle will repeat.

Figures 7A, 7B, 7C, 7D, 7E, 7F:
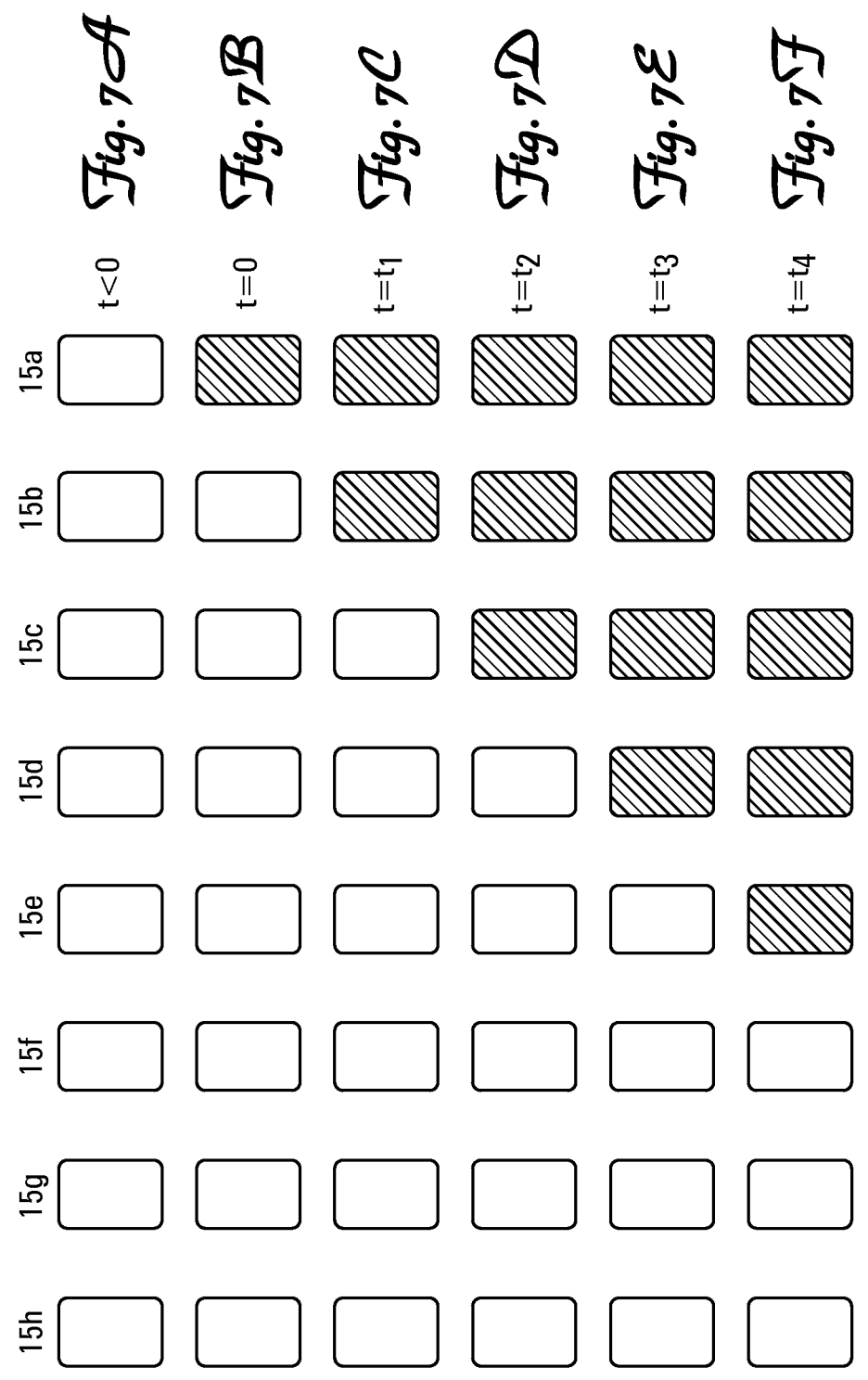

FIG. 7 describes another method of activating the visual indicators 15 to provide a more obvious measure of progress. In this embodiment, visual indicators (15a, 15b 15c, 15d, 15e, 15f, 15g, 15h . . . 15n) will not de-activate at the end of their indicator time interval. Thus, the leading edge of the indicators will be the target the welder 14 is attempting to follow. Once again, as seen in FIG. 7A, initially all visual indicators 15 will be inactive. Then, at time 0, the first visual indicator 15a will activate as seen in FIG. 7B. During the time that 15a is active, the welder 14 should be moving the gun from the beginning of the indication zone 30a to the end of it. After the indicator time interval, the first visual indicator 15a will remain activated and the second one 15b will activate, as seen in FIG. 7C. After another time interval, the first two visual indicators (15a and 15b) will remain activated and the next one 15c will activate as well as shown in FIG. 5d. This will continue until the final visual indicator 15n is reached. When that visual indicator 15n has been activated for one indicator time interval, all visual indicators (15a, 15b 15c, 15d, 15e, 15f, 15g, 15h . . . 15n) will de-activate and the first one 15a will activate again, and the cycle will repeat.

Improved resolution (i.e., a reduction in lag time between movement and feedback) and more timely feedback to the user can be provided by activating the visual indicator 15 in such a way as to achieve a variable intensity. For example, if a light emitting diode (LED) is used as the visual indicator 15, the LED can be driven with a pulse width modulated (PWM) signal that would result in a variable intensity. Keeping with our example 5 second interval time:

- At the 0 second mark, visual indicator 15a starts turning on, gradually increasing in intensity until it reaches peak intensity at the 2.5 second mark.
- At the 2.5 second mark, visual indicator 15a begins gradually dimming in intensity until it is fully de-activated at the 5 second mark.
- At the 5 second mark, the second visual indicator 15b begins activating, gradually increasing in intensity until it reaches peak intensity at 7.5 seconds.
- At the 7.5 second mark, the second visual indicator 15b begins gradually dimming in intensity until it is fully de-activated at the 10 second mark.
- And so on until the final visual indicator 15n is reached. After the final visual indicator 15n has de-activated, the cycle repeats with the first visual indicator 15a.

Additionally, this variable intensity indicator could be implemented such that the intensity begins at a low intensity at the beginning of a time internal and gradually increases to the peak intensity at the end, then goes out as the next indicator begins. In order to provide a visually indicated starting point at the location where a welder 14 wants to begin, a sensor 31 can be provided for detecting when the welder 14 brings the gun into a first activation zone and communicating with the processor to begin the activation sequences at that point. Alternatively, the previously described lighting patterns can be repeated as a chain across the indicator, so that the user can start following them at multiple points instead of having to wait for a single indicator to align with the starting point of their weldment 11. This is demonstrated in FIG. 8, where at time t=0, indicators 15a and 15d activate (FIG. 8B). At time t=$t_1$, indicators 15a and 15d de-activate, and indicators 15b and 15e activate (FIG. 8C), and so on such that a repeating chain of indicators is constantly scrolling across the speed indicator 10.

Another embodiment of the speed indicator 10 system uses one or more sensors 31 to detect the presence of the welding gun 11 or tool within an activation zone and uses that information to start the indicator light pattern at that activation zone where the gun is first detected. With this feature, the indication pattern would be off until the welder 14 brings the gun into position near the weldment 11, within range of the sensor 31. At this time, the pattern would begin and the user would be able to follow the light pattern from their starting point. Sensors that can detect the presence of an object within a particular field or area are well known in the art, and could be capacitive, infrared, inductive, or any other suitable technology that can detect a metallic object.

Figure 9:
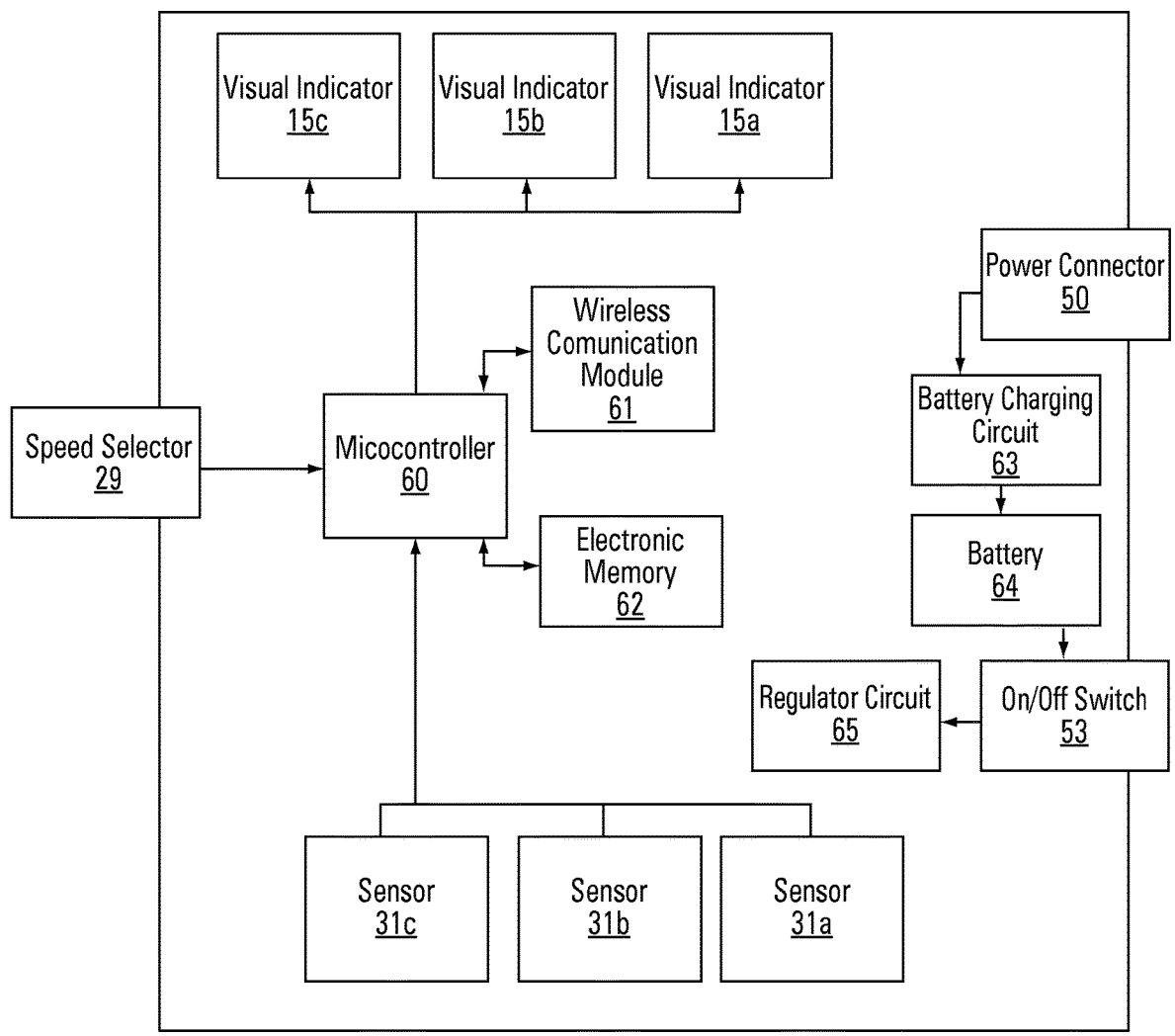
FIG. 9 is a schematic block diagram of the electrically interconnected components of one embodiment of the invention.

FIG. 9 is a block diagram of one embodiment of the speed indicator 10, which identifies internal components. In the preferred embodiment, the housing 21 contains a power connector 50 and an On/Off Switch 53. The On/Off Switch 53 connects or disconnects power between the battery 64 and the regulator circuit 65. When the On/Off Switch 53 is open, the system is unpowered. When the On/Off Switch 53 is closed, the battery 64 is connected to the regulator circuit 65 which regulates the voltage and provides it to the speed indicator 10 electronics. The battery 64 can be optional, with the circuit powered directly from a power supply connected through the power connector 50. Alternatively, the battery 64 could be a primary alkaline battery, and the power connector 50 could be removed. In the preferred embodiment, a rechargeable battery 64 is used, and when power is provided through the power connector 50, it supplies a battery charging circuit 63 to recharge and maintain the rechargeable battery 64.

The speed indicator 10 electronics are controlled by a microcontroller 60. The speed indicator 10 can communicate with the user through onboard interfaces such as the speed selector switch 29 or through another device through a wireless interface via the wireless communication module 61 (such as Bluetooth, WiFi, or the 802.15.4 protocol) to form part of a system where the user interface is implemented in another device or computer.

In some optional embodiments, sensors (not shown) are connected to the microcontroller 60 to collect data regarding the weld or welding environment, including any one or more of the following: presence of a welding tool in proximity to the sensor 31, presence of a welding arc, air temperature of the environment, temperature of the metal, gas content of the air, and so on. This data could be simply tracked and stored for later use, or it could be used to provide feedback or warnings to the welder 14. The microcontroller 60 has access to electronic memory storage 62 for this purpose. This data could also be used to adjust the target welding space based on the sensed parameters, or to simply begin cycling the visual speed indicators 10 in the vicinity of the welding tool when the welder 14 brings it into the vicinity of the weldment 11.

The microcontroller 60 is also operatively connected to the visual indicators (15a, 15b, 15c . . . ). Only three visual indicators 15 are explicitly shown here in FIG. 9, but any number of them can be used, with a number in excess of ten generally preferred and a number in excess of twenty most preferred. The embodiment depicted in FIG. 1 has twenty four visual indicators 15. While the described embodiments refer to discrete indicators at a fixed distance apart, one can appreciate that a series of indicators could be placed close enough together to create the perception of a continuous indicator which would appear to be continuously moving at the desired speed. The described indicator patterns could be implemented on such a system as previously described. Indicators could be implemented as an LCD screen, or as a light bar such as an Avago HDSP-4832, or as a discrete LED such as a Kingbright APTD1608SURCK.

Figure 10:
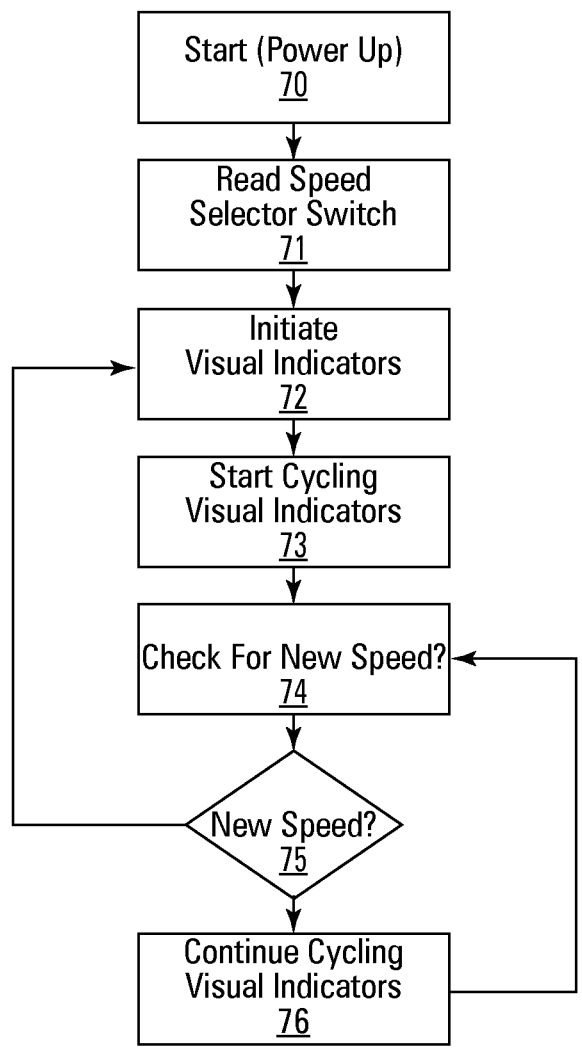
FIG. 10 is a software flow chart for one embodiment of the invention.

FIG. 10 describes one embodiment of a software operation of the speed indicator 10. Referring to FIG. 10, the system starts upon power up of the circuit at 70. It then checks the status of the speed selector switch at 71 and initiates the visual indicators at 72. This step involves identifying the correct time periods when indicators should be on, both sequence, start time, and stop time. In the next step, the system starts cycling visual indicators at 73 or quite simply it begins activating and deactivating the indicators. The system will periodically monitor the speed selector switch 29 to see if its status changes at 74, and then branches based on this result at decision step 75. If there is a new speed setting, the system loops back to step 72 and initiates the visual indicators 15 to the new speed setting. If the speed setting has not changed at step 75, the system continues cycling the indicators as it was at 76 and then loops back to do another check at step 74. In the preferred embodiment, this continues indefinitely until power is removed from the system.

In order to ensure that the visual indicators 15 are visible over the very-bright puddle created during an actual weld, the reflection of the puddle can be used as the visible indicator. This could be accomplished by using a series of movable panels to change the reflection angle of the light emanating from the puddle so that it is visible by the user even through the protective dimming lenses of welding helmets.

It can also be appreciated that while the aforementioned example indication schemes describe a right to left direction of travel, some processes and welding procedure specifications call for a left to right travel direction. Additionally, this direction of travel can satisfy push versus pull techniques, or accommodate left-handed versus right-handed welders 14. All of the described schemes can work equally well going in the opposite direction. Direction of travel can be set either with another dedicated two-state switch, or in a remote user interface as previously described, whereby it is communicated electronically to the speed indicator 10.

A user interface has been mentioned during this detailed description. One embodiment of this user interface is one or more switches or controls, such as the speed selector 29 found in FIG. 2. This would enable the welder 14 to dial in the desired target speed immediately before commencing welding and without requiring any additional hardware.

One can appreciate that a more involved user interface could be built into the speed indicator 10. For example, an LCD screen and a set of buttons could be added to the outside of the housing 21 that would enable greater flexibility in the type of information provided to the welder 14 or options for which the welder 14 to select.

Additionally, and in particular if the speed indicator 10 is used as part of a larger welding sensing, tracking, or training program, it may be preferred to have the user interface exist on a remote computing device (such as a computer, tablet, mobile device) which could be communicating with a number of speed indicators 10 and welding sensors 31. The software application running on such a computing device could contain a library of possible welding procedure specifications (WPS), a common industry tool for specifying how a particular weld should be performed. The user can select the WPS that best reflects the weld they are about to perform. The software application can then send the target welding speed to the speed indicator 10.

Use of a Preferred Embodiment

This section describes the intended operation of the preferred embodiment only. Other embodiments or applications are foreseen which could modify the following description.

The welder 14 will begin by preparing the weldment 11, which includes selecting and positioning appropriate metal pieces. The welder 14 will set up the welding equipment including adjusting wire type, wire speed, voltage, current, and/or other settings as necessary to appropriately configure the equipment. The welder 14 will then position the speed indicator 10 next to the weldment 11, ensuring that the visual indicators 15 are near the weld joint 12. The welder 14 will turn on the speed indicator 10. The welder 14 will turn the speed selector switch 29 to the desired welding speed. The speed indicator 10 will immediately begin activating the visual indicators 15 as described in the detailed description to provide a target speed indication.

The welder 14 will address the weldment 11 and position themselves as if they are about to perform the actual weld. The welder 14 will do at least one dry run, performing the motions of the weld without actually activating the welding gun 13. As the welder 14 moves the welding gun 13 along the weld joint 12, the welder 14 will attempt to keep the gun synchronized with one of the activated visual indicators 15.

When the welder 14 is comfortable that they have calibrated their muscle memory with the desired speed, the welder 14 will activate the welding gun 13 and actually perform the weld while trying to maintain that calibrated speed.

Once the weld is complete, the welder 14 will turn off the speed indicator 10 and remove it from the work area. If additional welds must be performed, the welder 14 can repeat the self-calibration process as often as he feels it necessary. Alternately, the speed indicator 10 could be left operating on the welding bench for as long as the welder 14 is working there, serving as a constant reminder of the correct speed he should be maintaining.

We claim:

1. A welding speed pacing device comprising (a) an interconnected series of visible light emitters spaced a known uniform distance apart along a signaling path of travel, (b) an input device for providing a target welding speed, (c) a processor in electrical communication with the series of visible light emitters and the input device for sequentially activating the visible light emitters in representation of the location of a welding tool traveling along the signaling path of travel at the target welding speed, and (d) a portable frame configured to rest upon a surface with the series of visible light emitters mounted upon a laterally extending beam supported by the frame a vertical distance above the surface.

2. The welding speed pacing device of claim 1 wherein each visible light emitter is a visible light source.

3. The welding speed pacing device of claim 2 wherein the visible light sources are LEDs.

4. The welding speed pacing device of claim 1 wherein the signaling path of travel is linear.

5. The welding speed pacing device of claim 1 wherein the signaling path of travel is curvilinear.

6. A method of pacing a welding speed, comprising the steps of (a) obtaining a welding speed pacing device according to claim 1, (b) obtaining a working or faux welding tool, (c) activating the welding speed pacing device to commence sequential activation of the visible light emitters at a selective speed of travel along the signaling path of travel to provide a paced visible representation of a target speed of travel, (d) moving the welding tool along a welding path of travel that runs parallel to the signaling path of travel at an actual speed of travel, (e) observing any differences between the actual speed of travel and the paced visible representation of a target speed of travel.

7. The method of claim 6 further comprising the step of adjusting the actual speed of travel to reduce any observed contemporaneous differences between the actual speed of travel and the paced visible representation of a target speed of travel.

8. The method of claim 6 wherein the welding tool is a working welding gun and the method further comprises the step of welding a welding coupon with the welding gun as the welding gun is moved along the welding path.

9. A welding speed pacing device comprising (a) an interconnected series of visible light emitters spaced a known uniform distance apart along a signaling path of travel, (b) an input device for providing a target welding speed, and (c) a processor in electrical communication with the series of visible light emitters and the input device for sequentially activating the visible light emitters in representation of the location of a welding tool traveling along the signaling path of travel at the target welding speed, wherein the intensity of the visible light emitted from each activated visible light emitter increases over time representative of travel towards the activated visible light emitter.

10. The welding speed pacing device of claim 9 wherein the intensity of the visible light emitted from each activated visible light emitter decreases over time representative of travel away from the activated visible light emitter.

11. The welding speed pacing device of claim 10 wherein at least two visible light emitters are activated to represent location of a traveling welding tool between the at least two visible light emitters.

12. The welding speed pacing device of claim 9 wherein the rate of change in intensity correlates to the target welding speed.

13. A welding speed pacing device comprising (a) an interconnected series of visible light emitters spaced a known uniform distance apart along a signaling path of travel, (b) an input device for providing a target welding speed, and (c) a processor in electrical communication with the series of visible light emitters and the input device for sequentially activating the visible light emitters in representation of the location of a welding tool traveling along the signaling path of travel at the target welding speed, wherein the intensity of the visible light emitted from each activated visible light emitter decreases over time representative of travel away from the activated visible light emitter.

14. The welding speed pacing device of claim 13 wherein the rate of change in intensity correlates to the target welding speed.

15. A welding speed pacing device comprising (a) an interconnected series of visible light emitters spaced a known uniform distance apart along a signaling path of travel, (b) an input device for providing a target welding speed, and (c) a processor in electrical communication with the series of visible light emitters and the input device for sequentially activating the visible light emitters in representation of the location of a welding tool traveling along the signaling path of travel at the target welding speed, wherein the input device is operable for providing a direction of travel to the processor, and the processor is operable for sequentially activating the visible light emitters to represent travel in the provided direction of travel.

16. A welding speed pacing device comprising (a) an interconnected series of visible light emitters spaced a known uniform distance apart along a signaling path of travel, (b) an input device for providing a target welding speed, (c) a processor in electrical communication with the series of visible light emitters and the input device for sequentially activating the visible light emitters in representation of the location of a welding tool traveling along the signaling path of travel at the target welding speed, and (d) a sensor in electrical communication with the processor for sensing a start location of a working or faux welding gun placed in proximity to the pacing device along a welding path of travel that runs parallel to the signaling path of travel, and wherein the processor is operable for transposing the start location along the welding path of travel onto a spatially corresponding location on the signaling path of travel, and commencing sequential activation of visible light emitters from the transposed start location.

17. The welding speed pacing device of claim 16 wherein each visible light emitter is a visible light window in selective visible light communication with a visible light source.

18. The welding speed pacing device of claim 17 wherein the visible light windows are LCDs.

19. The welding speed pacing device of claim 16 further comprising electronic memory containing a database of WPSs, each having a unique identifier and a plurality of predefined welding parameters including at least a welding speed, and wherein selection of a WPS from the database of WPSs using the input device selects the welding speed associated with the WPS as the target welding speed.

20. A method of pacing a welding speed, comprising the steps of (a) obtaining a welding speed pacing device according to claim 16, (b) obtaining a working or faux welding tool, (c) activating the welding speed pacing device to commence sequential activation of the visible light emitters at a selective speed of travel along the signaling path of travel to provide a paced visible representation of a target speed of travel, (d) moving the welding tool along a welding path of travel that runs parallel to the signaling path of travel at an actual speed of travel, (e) observing any differences between the actual speed of travel and the paced visible representation of a target speed of travel.

* * * * *